(12) United States Patent
Haugaard et al.

(10) Patent No.: US 12,038,296 B2
(45) Date of Patent: Jul. 16, 2024

(54) SYSTEMS AND METHODS FOR IDENTIFYING ALTERNATIVE ROUTES FOR TRIPS

(71) Applicant: Rivian IP Holdings, LLC, Plymouth, MI (US)

(72) Inventors: Timothy Haugaard, Honolulu, HI (US); Thomas Rideout, Snohomish, WA (US); Michael P. Slattery, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 87 days.

(21) Appl. No.: 16/933,005

(22) Filed: Jul. 20, 2020

(65) Prior Publication Data

US 2022/0018676 A1 Jan. 20, 2022

(51) Int. Cl.
*G01C 21/36* (2006.01)
*G01C 21/34* (2006.01)

(52) U.S. Cl.
CPC ..... *G01C 21/3617* (2013.01); *G01C 21/3484* (2013.01); *G01C 21/362* (2013.01); *G01C 21/3691* (2013.01)

(58) Field of Classification Search
CPC ............ G01C 21/3617; G01C 21/3484; G01C 21/362; G01C 21/3691
See application file for complete search history.

(56) References Cited

U.S. PATENT DOCUMENTS

| | | | |
|---|---|---|---|
| 10,222,229 B1* | 3/2019 | Shum | G01C 21/3697 |
| 10,324,463 B1* | 6/2019 | Konrardy | G01S 19/39 |
| 10,942,520 B1* | 3/2021 | Copeland | G06Q 50/30 |
| 11,441,916 B1* | 9/2022 | Konrardy | G01C 21/3617 |
| 2012/0239288 A1* | 9/2012 | Forutanpour | G01C 21/3476 701/410 |
| 2016/0171521 A1* | 6/2016 | Ramirez | G08G 1/0112 701/409 |
| 2018/0276485 A1* | 9/2018 | Heck | G06F 18/23 |
| 2021/0125428 A1* | 4/2021 | Tedesco | G07C 5/0808 |
| 2021/0341300 A1* | 11/2021 | Beaurepaire | G01C 21/3492 |

* cited by examiner

*Primary Examiner* — Jess Whittington
(74) *Attorney, Agent, or Firm* — Patterson + Sheridan, LLP

(57) ABSTRACT

Disclosed embodiments include apparatuses, systems, and methods for identifying alternative routes of travel between an origin and a destination. An illustrative embodiment includes a vehicle data system. The vehicle data system is configured to determine a trip to be taken from an origin to a destination in a vehicle. The vehicle data system is configured to identify available routes of travel for the vehicle from the origin to the destination. The vehicle data system is configured to perform a comparison of the available routes to determine a recommended route presenting a reduced likelihood of the vehicle experiencing a loss-related incident. The vehicle data system is configured to present the recommended route to an operator of the vehicle and to receive a selection from the operator as to whether the operator accepts the recommended route.

20 Claims, 13 Drawing Sheets ured to determine a trip to be taken from an origin to a destination in the vehicle. The vehicle data system is configured to identify available routes of travel for the vehicle from the origin to the destination. The vehicle data system is configured to perform a comparison of the available routes to determine a recommended route presenting a reduced likelihood of the vehicle experiencing a loss-related incident. The vehicle navigation data system is configured to present the recommended route to an operator of the vehicle and to receive a selection from the operator as to whether the operator accepts the recommended rout.

SYSTEMS AND METHODS FOR IDENTIFYING ALTERNATIVE ROUTES FOR TRIPS

INTRODUCTION

The present disclosure relates to apparatuses, systems, and methods for helping a driver to benefit from identifying an alternative route of travel.

The statements in this section merely provide background information related to the present disclosure and may not constitute prior art.

Drivers may choose to travel to their destinations via many different routes. Drivers may frequently travel from home to work, to a grocery store, to a child's school, and back, as well as between these different destinations. In traveling to these destinations, the driver may choose from among various alternative routes. Some routes may include highways, freeways, surface or neighborhood streets, etc. Some of these routes may have advantages over the others: some may be of the shortest distance, some may take the shortest travel time, some may avoid traffic, some may avoid busy intersections, some may avoid tolls, etc. The driver may face many conflicting choices.

A number of automobile manufacturers offer vehicles with driver assistance features, including warning the driver when the vehicle is veering out of its lane, warning the driver of a vehicle in a blindspot, altering a set cruise control speed to conform to the speed of cars ahead, braking automatically when a possible collision is detected, etc. Some automobile manufacturers are developing automated driving systems that will automatically drive the car on highways or some other streets. However, driver assist and automated driving systems may operate better on some types of roadways than others. For example, cruise control may not be very useful on residential streets where frequent stops may be necessary. Thus, a driver may face many potentially conflicting choices in deciding which route to take to a destination to save time, avoid traffic, take advantage of automated driving systems, or to satisfy other considerations.

SUMMARY

Disclosed embodiments include apparatuses, systems, and methods for identifying alternative routes of travel between an origin and a destination, and to identify prospective automobile insurance savings achievable through use of the alternative routes.

In an illustrative embodiment, an apparatus includes a vehicle data system. The vehicle data system is configured to determine a trip to be taken from an origin to a destination in a vehicle. The vehicle data system is configured to identify available routes of travel for the vehicle from the origin to the destination. The vehicle data system is configured to perform a comparison of the available routes to determine a recommended route presenting a reduced likelihood of the vehicle experiencing a loss-related incident. The vehicle data system is configured to present the recommended route to an operator of the vehicle and to receive a selection from the operator as to whether the operator accepts the recommended route.

In another illustrative embodiment, a vehicle includes a cabin configured to receive an operator. A drive system is configured to motivate, accelerate, decelerate, stop, and steer the vehicle. An operator control system is configured to allow the operator to direct operations of the vehicle. An operator assist system configured to perform at least one function chosen from autonomously controlling the vehicle without assistance of the operator and assisting the operator in controlling the vehicle. A vehicle data system is config- In a further illustrative embodiment, a computer-implemented method includes determining a trip is being taken from an origin to a destination in a vehicle. Available routes of travel from the origin to the destination are identified. A comparison of the available routes is performed to determine a recommended route presenting a reduced likelihood of a loss-related incident. The recommended route is presented to an operator and a selection of whether to take the recommended route is received Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two-digits of the figure numbers, respectively, in which the element first appears.

The following description explains, by way of illustration only and not of limitation, various embodiments of systems, apparatuses, and methods for helping an operator to benefit from identifying an alternative route of travel.

Figure 1:
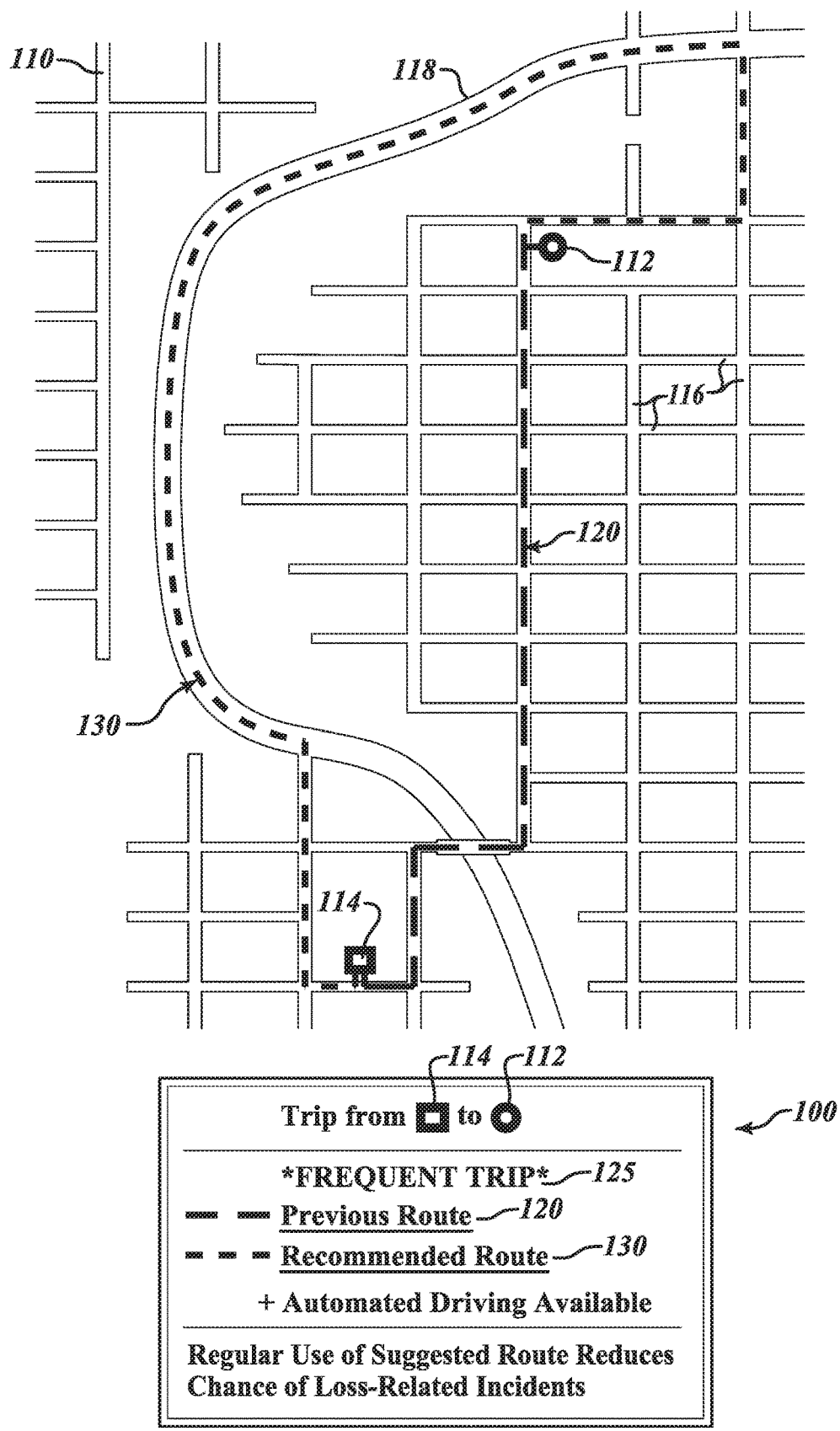
FIG. 1 is a schematic diagram of a map showing alternative routes on a trip being taken by an operator of a vehicle and a screen display reporting an alternative route.

Referring to FIG. 1, various embodiments of the present disclosure include a vehicle data system 100 to receive information a user's intended destination 112 from a point of origin 114. The trip may include a trip that the vehicle data system 100 does not have a record of being previously traveled. Alternatively, if the vehicle data system 100 does identify the route as a previously-traveled or frequently-traveled route, the vehicle data system 100 may identify a safe route and contrast it with previously-travelled routes. When the trip is identified as a previously-traveled or frequently-traveled trip 125, the vehicle data system 100 is configured to recommend an alternative route to the destination 112 that presents a reduced likelihood of a loss-related incident as compared to the risk posed by a previous route taken or that of a number of previous routes taken. Irrespective of whether the trip has been previously traveled, the vehicle data system 100 may present a recommended route that presents the lowest likelihood of vehicle-related loss.

Routes presented may include travel on surface or local streets 116 and/or highways or freeways 118. The recommended route may be identified as presenting a lower likelihood of a loss-related incident because, as shown in FIG. 1, the recommended route has an advantage (indicated with a "+" by the vehicle data system 100) in that the recommended route is well-suited to the use of an automated driving mode; in other cases, the vehicle data system 100 may indicate that there is an advantage in that one or more operator assist features supported by the vehicle are available on the recommended route. A map 110, which may be presented by the vehicle data system 100, may represent the origin 114, the destination 112, a previously-traveled route 120 and a recommended route 130. The vehicle data system 100 may present the previous route 120 and/or the recommended route 130 in graphically and/or in textual form. It should be noted that a loss-related incident may include a collision, damage to the vehicle that may be caused by condition of a poorly maintained roadway surface, theft or vandalism as a result of a parking location, or any incident that would result in some loss to the vehicle.

Figure 2:
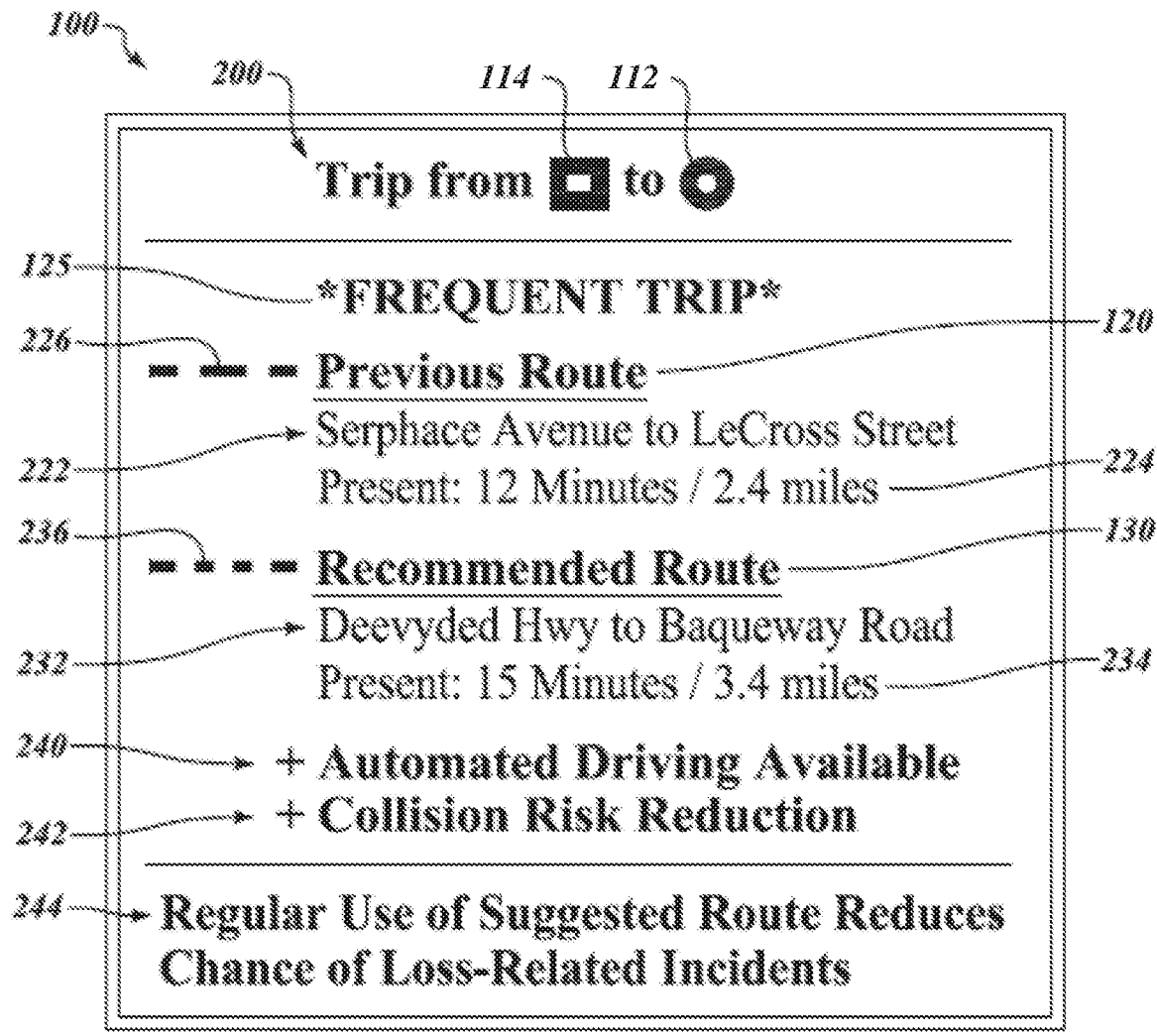
FIG. 2 is the screen display of FIG. 1 providing additional detail.

Referring to FIG. 2, a display 200 of the vehicle data system 100 presents information to the operator to enable the operator to make an informed decision about taking the recommended route. Once the destination 112 has been specified by the operator or is otherwise identified and the vehicle data system 100 determines the origin 114 of the trip, the system 100 may evaluate the trip being taken. The vehicle data system 100 may identify the trip from the origin 114 to the destination 112 as a trip that has not previously been traveled, or the vehicle data system 100 may recognize it as a previously-taken or a frequently-taken trip 125. In the latter cased, the system 100 may identify the previous route 120 taken on the frequent trip 125. The vehicle data system 100 may present route details 222 of the previous route 120, thereby enabling the operator to confirm that the vehicle data system 100 is aware of the previous route 120. The vehicle data system 100 also may provide a travel time and/or distance 224 for the trip when the previous route 120 was followed. The travel time and/or distance 224 may present an actual travel time for the most recent trip on the previous route 120 or an average travel time of prior trips taken on the previous route 120.

In presenting the recommended route 130, the vehicle data system 100 may present route details 232 identifying the recommended route 130. The recommended route may include a particular course to follow to the destination and/or a slight change in the ultimate destination, for example, to a parking location that may result in a reduced risk of loss from vandalism, theft, or other factors. A projected travel time and/or distance 234 also may be presented to help the operator decide which route to follow. The vehicle data system 100 may recommend routes that have a projected travel time within a variance of the actual, average, or projected travel times for other available routes. For example, it may be undesirable to present a recommended route for which the travel time is double than that for another available route. A maximum variance may be recognized by the vehicle data system 100, and the vehicle data system 100 may elicit an acceptable maximum variance from an operator. Although not shown in FIG. 2, when the recommended route 130 is accepted, if not already presented, the system 100 may present turn-by-turn instructions for the recommended route 130. In various embodiments, when the system presents the map 110 (FIG. 1) of the routes 120 and 130, the system 100 may present a legend 236 identifying the recommended route 130 on the map 110, as well as a legend 226 signifying the previous route 120 on the map 110.

In various embodiments, in presenting the recommended route, the system 100 may present reasons 240 for the operator to travel along the recommended route 130. The reasons 240 may include operator assistance available to the operator, such as automated driving. Automated driving may be available on highways or freeways but not on surface or residential streets because of the more sporadic stop-and-go driving that may attend driving on surface or residential streets. The reasons 240 also may identify or one or more other assistance features, such as lane departure warning or lane keeping assistance that may be available on highways and freeways. The reasons 240 also may include benefits 242 of choosing the recommended route 130, such as a reduced collision risk as a result of the automated driving or operator assistance features, a better road surface to help avoid damage to tires or the suspension of the vehicle, or other benefits.

In various embodiments, the system 100 may also present a financial benefit 244. For example, when the system 100 is in communication with an automobile insurance provider for the vehicle and/or one or more operators of the vehicle, or where the provider of the system 100 is the automobile insurance provider, the system 100 may identify to the operator that potential automobile insurance savings are available if the operator uses or regularly uses the recommended routed 130. By collecting and correlating data as further described below, the automobile insurance provider may quantify how using the selected route 130, possibly in concert with automated driving or operator assist features, may help the operator possibly avoid an accident. As a result, the automobile insurance provider can help determine the costs to be saved in avoiding potential loss-related incidents and pass on some of the savings in the form of reduced automobile insurance premiums or another financial benefit 244.

Figure 3:
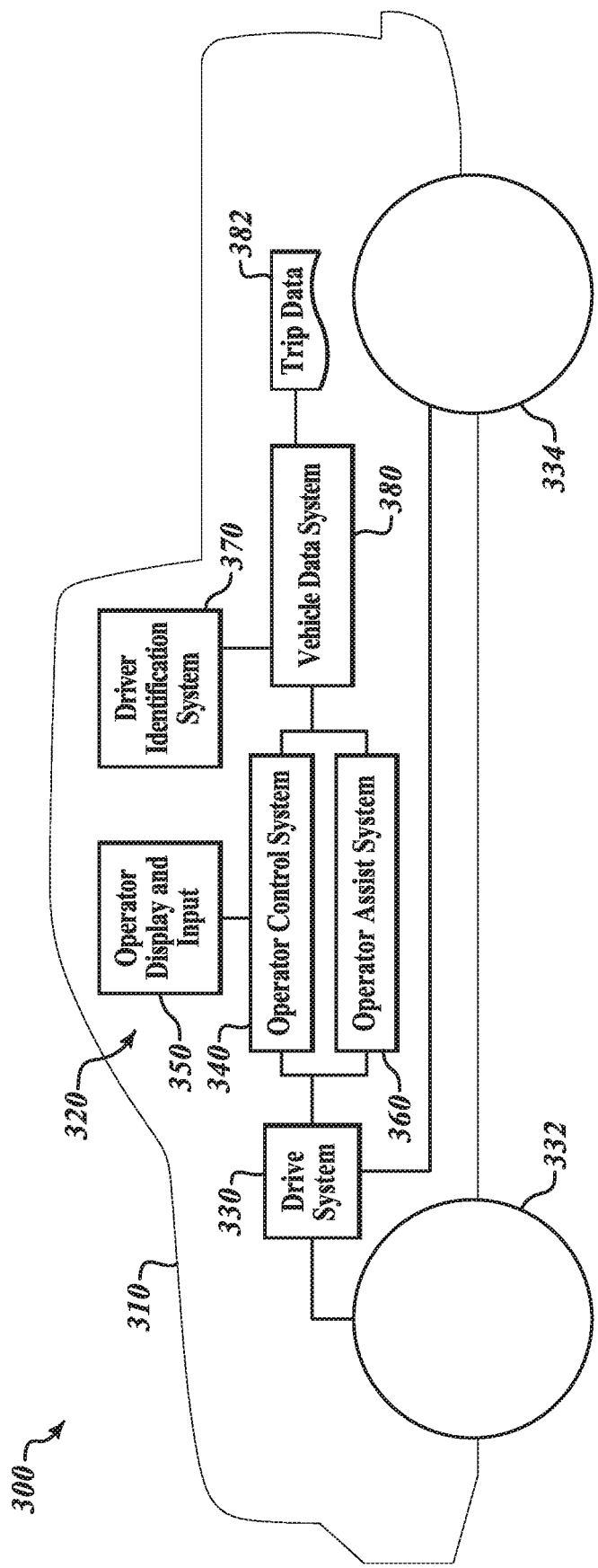
FIG. 3 is a block diagram of a vehicle with an on-board system for logging trips and for recommending an alternative route.

Referring to FIG. 3, a vehicle 300 includes onboard systems to identify routes traveled by the vehicle and/or operators thereof and to identify and recommend alternative routes corresponding to enhanced vehicle capabilities. The vehicle 300 may include a car, truck, sport utility vehicle (SUV), or similar vehicle for on-road and/or off-road travel. The vehicle 300 includes a body 310 that supports a cabin 320 to accommodate an operator and, optionally, one or more passengers. The body 310 of the vehicle 300 also accommodates a number of systems.

The vehicle 300 includes a drive system 330 that, in concert with front wheels 332 and rear wheels 334, motivates, accelerates, decelerates, stops, and steers the vehicle 300. In various embodiments, the drive system 330 is directed by an operator control system 340 and/or an operator assist system 360. The operator control system 340 works in concert with an operator display and input system 350 within the cabin 320. The operator display and input system 350 includes all the operator inputs, including the steering controls, the accelerator and brake controls, and all other operator input controls. The operator display and input system 350 also includes the data devices that provide information to the operator, including the speedometer, tachometer, fuel gauge, temperature gauge, and other output devices. When the vehicle 300 is equipped with the operator assist system 360, the operator display and input system 350 also allow the operator to control and interact with the operator assist system 360.

The operator assist system 360 includes available automated, self-driving capabilities or other features that assist the operator, such as a forward collision warning system, an automatic emergency braking system, a lane departure warning system, and other features described below with reference to FIG. 6. The operator assist system 360 thus partially or fully controls operation of the vehicle 300 and/or provides warnings to the operator that help the operator to avoid accidents. The operator assist system 360 thus, instead of or in concert with the operator control system 340, engages the drive system 330 to motivate, accelerate, decelerate, stop, and steer the vehicle 300 and/or to provides information and warnings to the operator of the vehicle 300.

In various embodiments, the vehicle 300 also includes a vehicle data system 380. The vehicle data system 380 receives and tracks positioning data, such as global positioning system (GPS) data, to provide navigation assistance to help an operator navigate when the operator controls the vehicle 300 using the operator control system 340. The vehicle data system 380 also provides navigational data to the operator assist system 360 to allow the operator assist system 360 to control the vehicle 300. The vehicle data system 380 is operable to receive and store map data and to track positions of the vehicle 300 relative to the map data using GPS or other positioning information. In addition, the vehicle data system 380 may log the positioning information about trips that are being taken and have been taken. The vehicle data system 380 thus can determine routes that the vehicle 300 has traveled between various locations, such as the origin 114 and destination 112 (FIGS. 1 and 2). From this list of routes that have been traveled, the vehicle data system 380 may identify trips that the vehicle 300 has traveled. The vehicle data system 380 may be a data system incorporated into the vehicle 300 or may include another device, such as a computing device that may be carried aboard the vehicle 300, such as a tablet computer, a smartphone, a smartwatch, or another portable computing device. In various embodiments, whether the vehicle data system 380 includes a data system integrated into the vehicle 300 or is a separate and/or portable device, the vehicle data system 300 is able to communicate with sensors and systems aboard the vehicle 300 through wired or wireless communications with other systems aboard the vehicle 300.

As further described below, in addition to the vehicle data system 380 logging positional data, the vehicle data system 380 logs other information received from the operator control system 340 or the operator assist system 360 including historical data such as speed, rapid acceleration, braking data, and other information to be able to evaluate or score these previous trips. As a result, the vehicle data system 380 can determine which previous trips and/or frequent trips show indicia of risk or the lack thereof. By evaluating data from previous trips, the vehicle data system 380 can determine whether alternative routes that correspond to expanded vehicle capabilities may be available, possibly through the use of the operator assist system 360. In turn, this information may be used to present the benefits 242 or financial benefits 244 (FIG. 2) that may be achieved by taking different routes.

It will be appreciated that the cost of automobile insurance is calculated both in terms of the characteristics of the vehicle driven and of the operator. The cost of automobile insurance may vary based on the horsepower of the vehicle, the crashworthiness of the vehicle, the operator assistance features with which the vehicle is equipped, and other attributes. The cost of automobile insurance also may vary based on the age, experience, driving record, and other characteristics of the operator. Accordingly, in being able to determine the benefits 242 or financial benefits 244, it may be appropriate to identify who is the operator of the vehicle 300, to log the operator identity information in the trip data 382 for past trips and to evaluate what may be an alternative route for present and future trips. To this end, in various embodiments, the vehicle 300 also includes an operator identification system 370 in communication with the vehicle data system 380 to identify the operator. As further described below, various embodiments of the operator identification system 370 may identify the operator based on the operator's seat being moved to a position used by a particular operator, by detecting a key fob assigned to a particular operator, by identifying a presence in the cabin 320 of a cell phone owned by a particular operator, by using an imaging system to identify the operator, or through other devices and methods.

In addition to the onboard systems, various embodiments may communicate with remote computing systems to perform the functions herein described. For example, it may be desirable to communicate the trips data 382 to a remote computing system for analysis of data on prior trips or to identify frequently-taken trips. The remote computing systems may be used to evaluate and score the risk associated with those different trips. The remote computing systems also may be used to identify routes on which automated driving or operator assistance features are available and may lead to lower likelihood of an incident during travel, alternative routes, benefits that may be achieved in using those routes, and financial benefits that may be achieved from using a particular recommended route.

Figure 4:
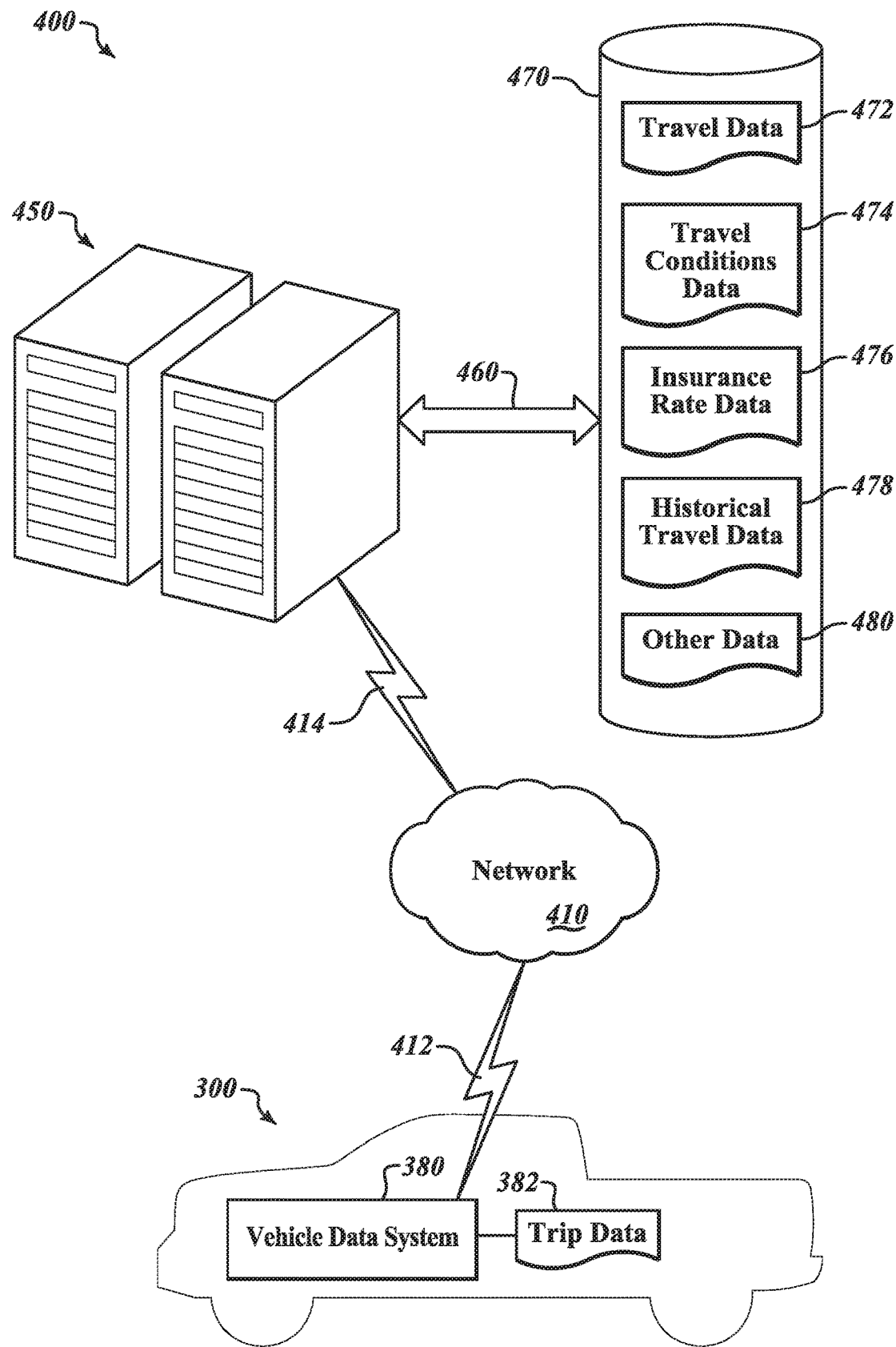
FIG. 4 is a block diagram of an on-board computing system communicating with a remote system to facilitate determination of a route and/or an alternative trip.

Referring to FIG. 4, an operating environment 400 of the vehicle 300 may include a remote computing system 450 that is configured to communicate, for example, with the vehicle data system 380 of the vehicle 300. The vehicle data system 380 may send trip data 382 to the remote computing system 450 and receive data from the remote computing system 450 via a network 410. The vehicle data system 380 may connect to the network 410 via a wireless communications link 412, such as a satellite, cellular, or Wi-Fi communications link. When the vehicle 300 is parked, it is also possible that the vehicle 300 may be coupled to the network 400 a wired network link, such as a universal serial bus (USB) or Ethernet connection, which may be part of a wiring harness used to charge the vehicle 300 when it is an electric or hybrid vehicle. The remote computing system 450, which may include a server or server farm, also communicates with the network 410 over wired and/or wireless communications links 414. The remote computing system 450 may access programming and data used to perform its functions over a high-speed bus 460 with data storage 470.

Information maintained in the data storage 470 may include travel data 472 spanning large areas and, thus, may include data encompassing routes in the trip data 382. The travel data 472 thus may be used by the remote computing system 450 to evaluate the trip data 382, to evaluate the relative likelihood of incidence such as collision of previous or frequently used routes and/or to recommend an alternative route corresponding to expanded vehicle capabilities. In some other embodiments, the remote computing system 450 may access the travel data 472 and provide relevant portions via the network 410 to the vehicle data system 380 for the vehicle data system 380 to evaluate former trips and/or to recommend an alternative route. Similarly, the data storage 470 may include anticipatable travel conditions data 474 that may also be used in identifying alternative routes. For example, the anticipatable travel conditions data 474 may include roadway types, roadway condition, visibility, weather, or traffic data. The travel conditions data 474 may be correlated to various seasons, days of the week, time of day, etc., that may be useful in identifying alternative routes and identifying benefits 242 (FIG. 2) of traveling from an origin 114 to a destination 112 (FIGS. 1 and 2) at any particular time. The travel conditions data 474 may be updateable and may communicate updates to the vehicle data system 380 over the network 410.

In addition, the data storage 470 may include automobile insurance rate data 476 that can be used to identify potential financial benefits 244 (FIG. 2), such as automobile insurance savings that may be achievable if the operator adopts a recommended alternative route. The automobile insurance rate data 476 may include actuarial tables for operators of particular demographics, historical accident data for various areas and routes, and any other information that may be useful in determining a likelihood of risk. The risk information, in turn, may be used to determine the possible savings that an automobile insurance carrier may achieve if the operator takes an alternative route and what portion of the savings may be passed to the operator as an incentive.

The data storage 470 also may include historical travel data 478 for the vehicle and/or its operators. The historical travel data 470 may be used in identifying frequent trips, evaluating the possibility of alternative routes, and whether the alternative routes may result in a reduced risk of accidents that can benefit the insurance provider and the operator. The data storage 470 also may include any other data 480 that may be useful in helping to evaluate historical trip data, identify frequent trips, identify alternative routes, identify automobile insurance savings, or perform related functions.

The functions performed by the operator assist system 360, the vehicle data system 380, other onboard systems as shown in FIG. 3, or the remote computing system 450 as shown in FIG. 4, may be performed by various computing devices executing programming code created to support those functions. These devices may incorporate various implementations of computing systems understood by those with skill in the art.

Figure 5:
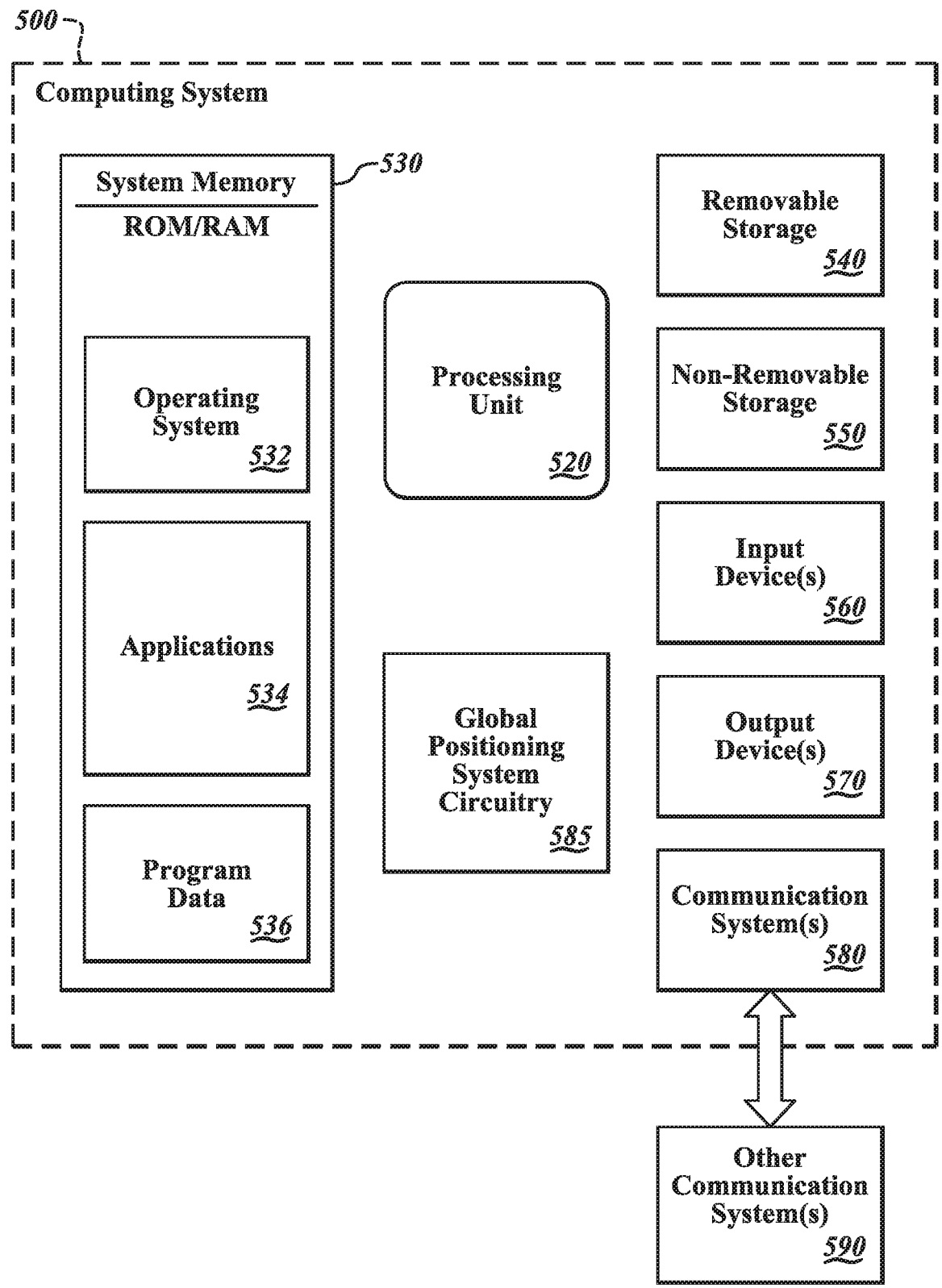
FIG. 5 is a block diagram of a computing system for performing functions of one or more on-board or remote systems.

Referring to FIG. 5, and given by way of example only and not of limitation, some form of a computing system 400 may be used for the computing systems aboard the vehicle 300 (FIG. 3) or at the remote computing system 450 (FIG. 4). In various embodiments, the computing system 500 typically includes at least one processing unit 520 and a system memory 530. Depending on the exact configuration and type of computing device, the system memory 530 may be volatile memory, such as random-access memory ("RAM"), non-volatile memory, such as read-only memory ("ROM"), flash memory, and the like, or some combination of volatile memory and non-volatile memory. The system memory 530 typically maintains an operating system 532, one or more applications 534, and program data 536. The operating system 532 may include any number of operating systems executable on desktop or portable devices including, but not limited to, Linux, Microsoft Windows®, Apple OS®, or Android®, or a proprietary operating system.

The computing system 500 may also have additional features or functionality. For example, the computing system 500 may also include additional data storage devices (removable and/or non-removable) such as, for example, magnetic disks, optical disks, tape, or flash memory. Such additional storage is illustrated in FIG. 5 by removable storage 540 and non-removable storage 550. Computer storage media may include volatile and non-volatile, removable and non-removable media implemented in any method or technology for storage of information, such as computer-readable instructions, data structures, program modules or other data. The system memory 530, the removable storage 540, and the non-removable storage 550 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing system 500. Any such computer storage media may be part of the computing system 500.

The computing system 500 may also have input device(s) 560 such as a keyboard, mouse, stylus, voice input device, touchscreen input device, etc. Output device(s) 570 such as a display, speakers, printer, short-range transceivers such as a Bluetooth transceiver, etc., may also be included. The computing system 500 also may include one or more communication systems 580 that allow the computing system 500 to communicate with other computing systems 590, for example, as the vehicle data system 380 aboard the vehicle 300 (FIG. 3) communicates with the remote computing system 450 and vice versa. As previously mentioned, the communication system 580 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In further reference to FIG. 5, the computing system 500 may include global positioning system ("GPS") circuitry 585 that can automatically discern its location based on relative positions to multiple GPS satellites. As described further below, GPS circuitry 585 may be used to determine a location of the vehicle 300 (FIG. 3) and to potentially identify alternative routes.

In the environment described with reference to FIGS. 3-5, the availability of operator assistance features to the operator assist system 360 (FIG. 3) may be significant in determining whether other routes may be better than other previously-traveled or frequently-traveled routes. For example, traveling along a highway or freeway may prove to be a better route corresponding to expanded vehicle capabilities when automated driving capability, automated braking, or blind spot warnings are available to prevent common types of highway mishaps. The availability of these operator assistance features may be important to evaluating the relative vehicle capabilities along different routes.

Figure 6:
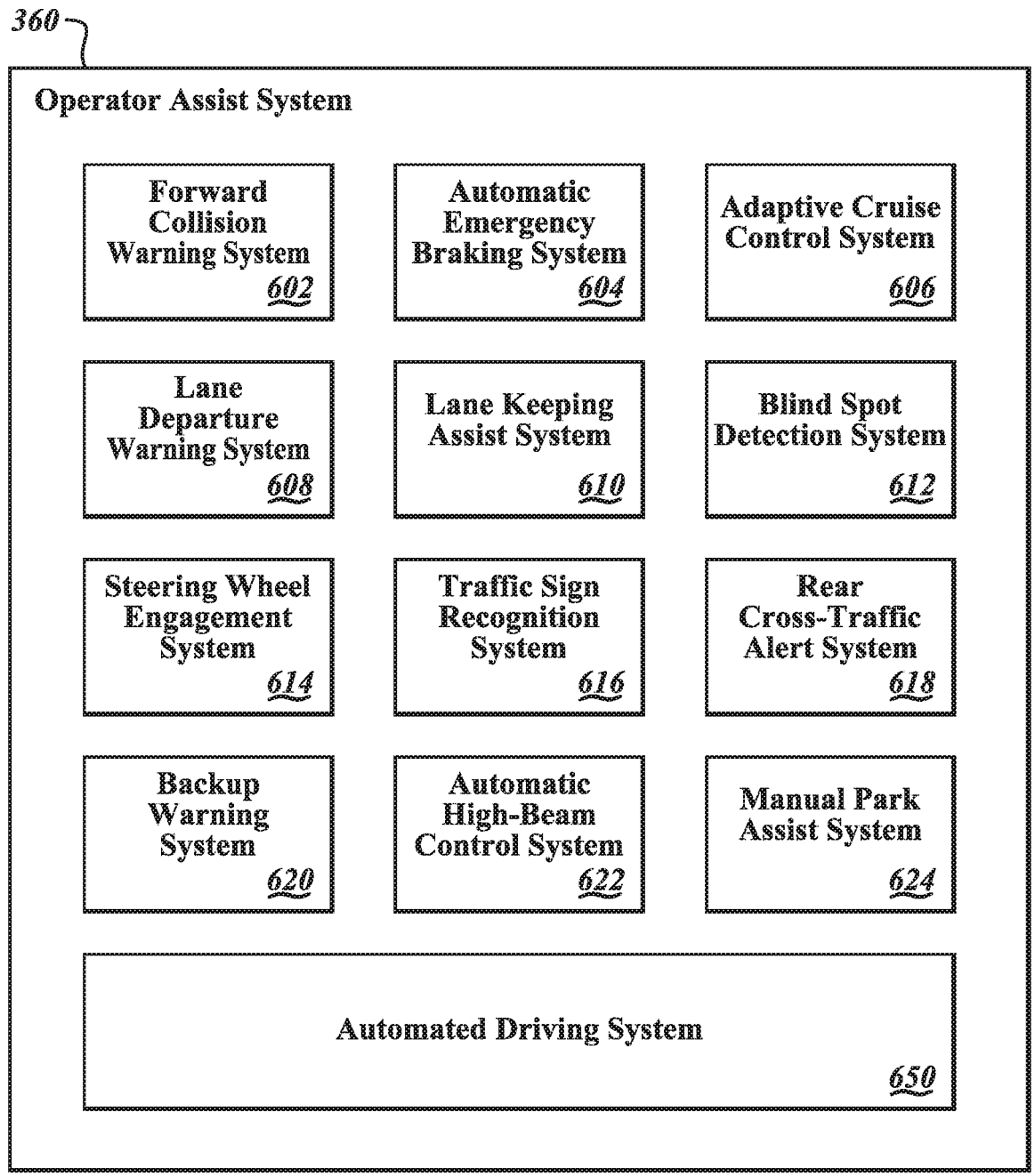
FIG. 6 is a block diagram of the system of FIG. 3.

Referring to FIG. 6, in addition to full automated driving, the operator assist system 360 may have any number of assistance features available of which the availability may have a bearing on the vehicle capabilities along a particular route. The output of these systems, whether indicating a particular measurement or just the activation or nonactivation of these systems, may be logged in the trip data 382 (FIG. 3) for evaluation or scoring of previous trips. The operator assist system 360 may include a forward collision warning system 602 to alert an operator, proceeding at a normal travel speed, of a stopped vehicle or other object in the road. The engagement of the forward collision warning system 602, or repeated use of the engagement of the forward collision warning system 602, may be indicative of operator inattention or of a route that may include dangers in the forms of abrupt vehicle stoppages. Similarly, the operator assist system 360 may include an automatic emergency braking system 604. While the forward collision warning system 602 alerts the operator to apply the brakes to avoid a stoppage or other object in the road, the automatic emergency braking system 604 actually automatically engages the brakes to stop the vehicle 300 of its own accord when a stoppage or other object is detected in the road. The engagement of the emergency braking system 604 also may be indicative of operator inattention or of a route that may include dangers in the forms of abrupt vehicle stoppages.

The operator assist system 360 also may include an adaptive cruise control system 606. The adaptive cruise control system 606 automatically adjusts a cruising speed, set by the operator or the cruise control system, to reflect the speed of traffic ahead. For example, if an operator sets the adaptive cruise control system 606 to a posted highway speed of 65 miles per hour but, because of traffic, the speed of vehicles in the road ahead travel varies between 55 and 65 miles per hour, the adaptive cruise control system 606 will repeatedly adjust the cruising speed to maintain a desired distance between the vehicle and other vehicles in the road ahead. Although the adaptive cruise control system 606 may not be particularly useful in surface or neighborhood streets, its availability and use on highways or freeways may signify that travel on highways or freeways represents a better route.

The operator assist system 360 may include a lane departure warning system 608 that alerts an operator when the vehicle is veering close to or across a lane marker, presenting an obvious hazard. Activation of the operator assist system 360 as logged in the trip data 382 for a route may indicate operator inattention or that a particular route is treacherous. The operator assist system 360 may include a lane keeping assist system 610 that steers the vehicle to prevent the vehicle from veering close to or across a lane marker. Availability and use of the lane keeping assist system 610 may indicate that a route amenable to the use of the lane keeping assist system 610 represents a preferable route of travel corresponding to expanded vehicle capabilities.

The operator assist system 360 may include a blind spot detection system 612 that alerts an operator of vehicles traveling in blind spots off the rear quarters of the vehicle to warn the operator not to change lanes in such cases. The operator assist system 360 may include a steering wheel engagement system 614 that detects when the operator has released the wheel. Release of the wheel may be logged to the trips data 382 as an indication of operator inattention. Previously-traveled routes on which the operator has regularly released the wheel may be indicative of a level of distraction on these routes that may make traveling those routes increase the likelihood of an incident such as a collision. The operator assist system 360 also may include a traffic sign recognition system 616 that, for example, recognizes stop signs or speed limit signs. Availability of the traffic sign recognition system 616 may make travel on surface or neighborhood streets preferable because the system will help reduce the likelihood of an accident caused by missing a sign or traveling at an inappropriate speed.

The operator assist system 360 also may include a rear cross-traffic alert system 618 to apprise an operator of the approach of other vehicles when the vehicle is moving out of a space. Similarly, the operator assist system 360 may include a backup warning system 620 that warns the operator when the vehicle is approaching an object behind the vehicle. The operator assist system 360 may include an automatic high-beam control system 622 to de-activate and re-activate high beams as other cars approach and then pass by. Availability of such a system may reduce the likelihood of incidents during travel on highways or surface streets with insufficient or no lighting. The operator assist system 360 also include a manual park assist system 624 to aid an operator in parking the vehicle.

Figure 7:
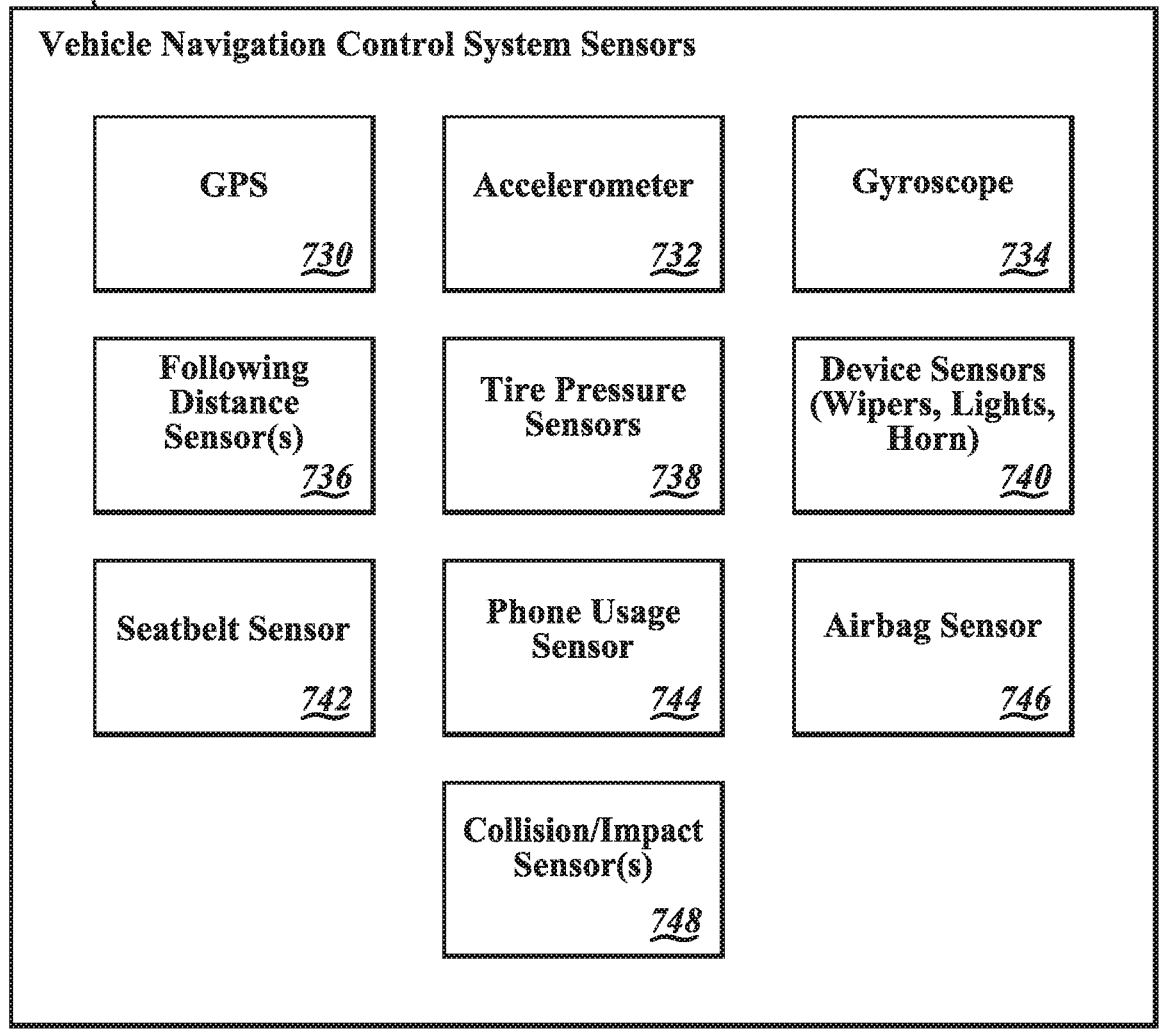
FIG. 7 is a block diagram of sensor systems useable by the system of FIG. 3.

Referring to FIG. 7, in addition to the devices included in the operator assist system 360, the vehicle data system 380 may include a number of other sensors whose information is logged in the trip data 382 (FIG. 3). The data from these sensors may be useful in determining whether routes previously taken or frequently traveled are less desirable than other routes. In addition to the GPS sensor 730, the vehicle data system 380 may include an accelerometer 732 to detect rapid accelerator or deceleration that may indicate overly-aggressive driving or hard braking as a result of operator inattention or dangerous traffic patterns. The vehicle data system 380 may include a gyroscope 734 to detect abrupt changes of direction indicative of a treacherous road, sharp lane changes, or abrupt turns. The vehicle data system 380 may include at least one following distance sensor 736 that determine how closely the vehicle 300 follows other vehicles. The following distance sensor 736 may use any technology that can determine following distance from another vehicle, such as radar, LIDAR, optical measurement made using cameras or other optical sensors, ultrasonic measurement, laser measurement, or any other technology that can be used to determine following distance from another vehicle. Logging the following distance data for particular routes may indicate whether the traffic conditions on those roads present a danger or whether the operator tends to follow other vehicles too closely on certain routes.

The vehicle data system 380 may also include device sensors, such as tire pressure sensors 738 to monitor whether the tires are inflated to a recommended level. The vehicle data system 380 also may include miscellaneous device sensors 740 to determine whether other systems, such as the lights, horn, and wipers have been used on particular routes. The vehicle data system 380 may also include a seatbelt sensor 742 to indicate whether the occupants wore seatbelts on particular routes. The vehicle data system 380 may also include a phone usage sensor 744 (which may take the form of an app executing on the phone) to report whether the operator was handling or operating the operator's phone on particular routes. Finally, the vehicle data system 380 may include an airbag deployment sensor 746 or a collision sensor 748 to report a catastrophic event that resulted in a collision and/or a serious collision that warranted deployment of the airbag.

The collection of data from these sensors, along with data collected from the operator assist system 360 (FIG. 6) may be used to perform a complete analysis of an operator's performance on particular routes to evaluate the score of the operator along various routes.

Table (1) presents a list of data that may be presented by the operator assist system 360 and/or the vehicle data system 380 as described with reference to FIGS. 6 and 7. Table (1) includes a data field that may be logged and, for example, a frequency with which the data is sampled and/or stored.

TABLE (1)

| Field | Description | Minimum Reporting Frequency |
|---|---|---|
| Driver ID | Unique identifier for each driver when available | NA |
| Trip ID | Unique identifier for a specific trip | NA |
| Trip Start | Start date and time of trip | NA |
| Trip End | End date and time of trip | NA |
| Road Speed | 1 Hz using multiple sensors | 1 Hz |
| GPS Accuracy | | 1 Hz |
| GPS Speed | | 1 Hz |
| GPS Altitude | | 1 Hz |
| GPS Heading | | 1 Hz |
| GPS Latitude | | 1 Hz |
| GPS Longitude | | 1 Hz |
| Accelerometer | | 10 Hz |
| Gyroscope | | 10 Hz |
| Collision/Impact Sensors | Calculate in real-time based on available sensor and contextual data | |
| Rear-ended | Calculate in real-time based on available sensor and contextual data | |
| Side impact | Calculate in real-time based on available sensor and contextual data | |
| Airbag Sensors | | 10 Hz |
| Vehicle Roll-over | Calculate in real-time based on available sensor and contextual data | |
| Vehicle Spin-out | Calculate in real-time based on available sensor and contextual data | |

TABLE (1)-continued

| Field | Description | Minimum Reporting Frequency |
|---|---|---|
| Vehicle Security Breach | Upon alarm triggering | 1 Hz |
| Odometer | Trip start/end | NA |
| Impact Sensor Event | As it happens | 10 Hz |
| Driver Seatbelt Event | On on/off | 1 Hz |
| Passenger Seatbelt Event | On on/off | 1 Hz |
| Following Distance | Identify driving behavior to segment risk factor based on following distance, relative to speed | 10 Hz |
| Hard Braking | Calculate hard brake events | 10 Hz |
| Rapid Acceleration | Calculate rapid acceleration events | 10 Hz |
| Aggressive Cornering | Calculate aggressive cornering | 10 Hz |
| Speed above PSL | Identify time above Posted Speed Limit | Post processing |
| Excessive Speed | Identify time above a fixed speed limit | 1 Hz |
| Steering Wheel Engagement System | | 1 Hz |
| Forward Collision Warning | | 10 Hz |
| Lane Departure Warning | | 10 Hz |
| Rear Cross Traffic on/Off | | 10 Hz |
| Rear Cross Traffic Warning | Identify when rear cross traffic event occurs | 10 Hz |
| Traffic Sign Recognition System | | 1 Hz |
| Manual Park Assist On/Off | | 10 Hz |
| Manual Park Assist Warning | Identify when manual park warning event occurs | 10 Hz |
| Navigation in-use | | 1 Hz |
| Auto Emergency Braking Engaged | | 10 Hz |
| Low Tire Air Pressure | Tire pressure below certain threshold (Front right, Front left, Rear right, Rear left) | 1 Hz |
| Autonomous Driving Mode On/Off | On on/off | 10 Hz |
| Adaptive Cruise Control | On on/off | 10 Hz |
| Blindspot Monitoring On/Off | On on/off | 10 Hz |
| Blindspot Warning | Identify when blindspot event occurs | 10 Hz |
| Backup Warning System | | 1 Hz |
| Headlights On/Off | On on/off | 10 Hz |
| Fog Lights On/Off | On on/off | 10 Hz |
| Automatic High Beam Control System | | 1 Hz |
| Rain Sensor | | 10 Hz |
| Windshield Wipers On/Off | On on/off | 10 Hz |

Some or all of the information listed in Table (1), along with other information, may be used to evaluate the trip data 382 to determine a score for the operator(s) while following previous routes. The trip data 382 thus may be scored to determine a basis for whether alternative routes identified by disclosed embodiments may result in a reduced likelihood of collision and increase in the use of vehicle operator assistance capabilities.

Figures 8, 9:
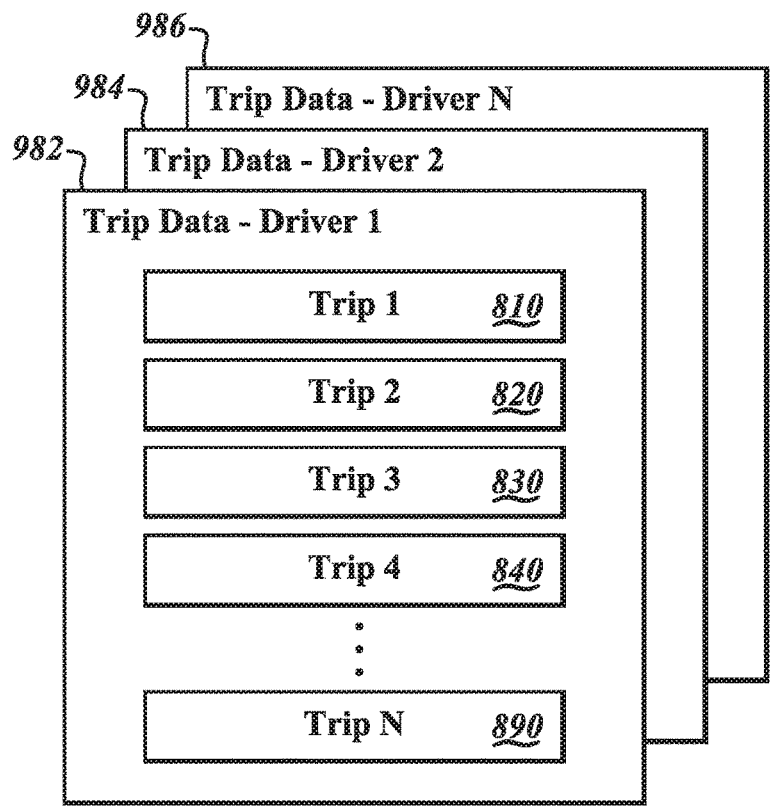
FIG. 8 is a schematic diagram of trip data for a vehicle generatable and accessible by the system of FIG. 3.
FIG. 9 is a schematic diagram of the trip data of FIG. 8 for each operator.

Referring to FIG. 8, the trip data 382 may include trip records for all the trips taken by the vehicle, including trip 1 810, trip 2 820, trip 3 830, trip 4 840, through trip N 890. Referring to FIG. 9, separate trip data may be stored for each identified operator of the vehicle, including trip data for operator 1 982, trip data for operator 2 984, through trip data for operator N 986. It will be appreciated that if the trip data is stored in a single set of trip data 382 as in FIG. 8, the trip data may include records to identify the operator of each trip, as shown in FIG. 10.

Figure 10:
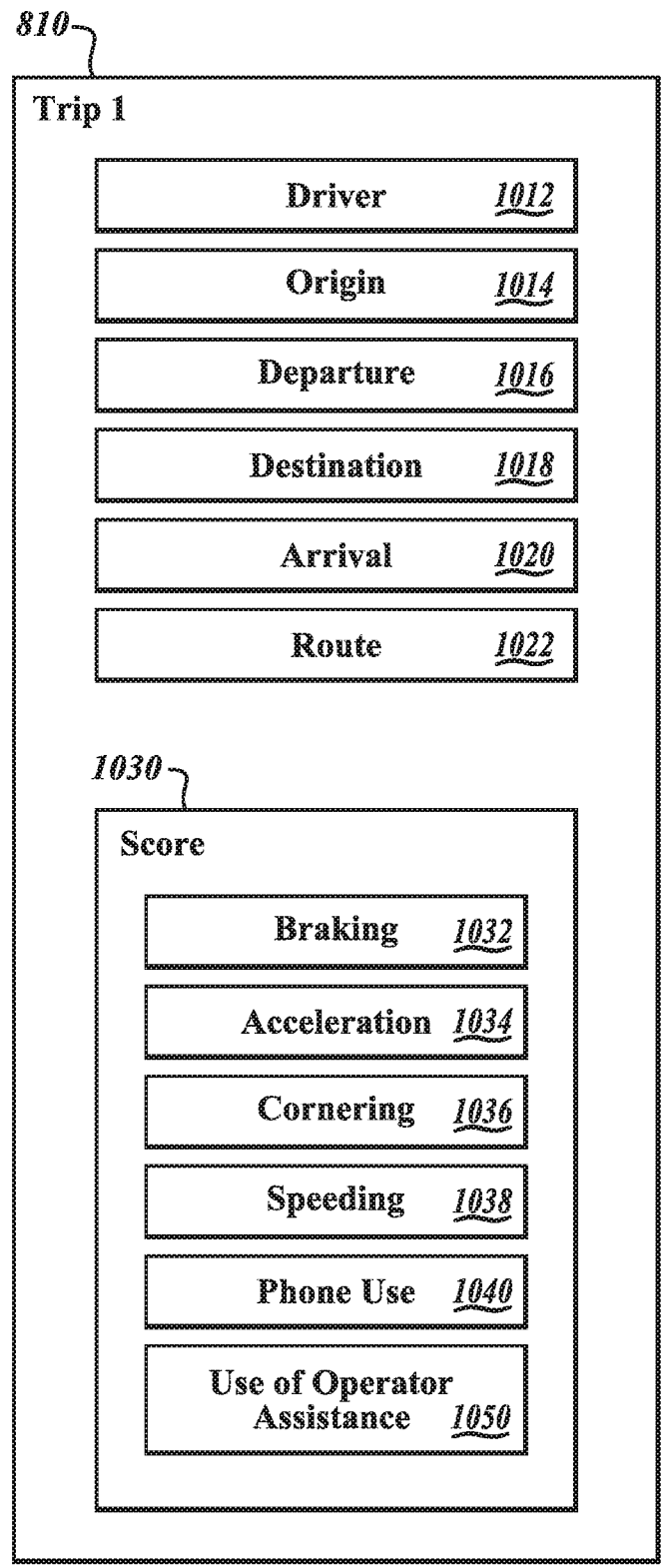
FIG. 10 is a schematic diagram of a trip record that may be stored in the trip data of FIGS. 8 and 9.

Referring to FIG. 10, a trip record for trip 1 810 may include numerous fields to store information that may be desired for evaluating the score of a particular trip. The trip 1 record 810 may include fields to identify the operator 1012, the origin of the trip 1014, the departure time 1016, the destination 1018, and the arrival time 1020. The trip 1 record 810 may include route information 1022 which may include a series of GPS locations to identify the entirety of the route taken between the origin 1014 and the destination 1018.

Based on the information stored in the trip 1 record 810, a score 1030 is assigned. As previously described, the scoring may be performed by the vehicle data system 380 or at a remote computing system 450 (FIG. 4). The overall score may be tabulated from a number of different elements or data or individual scores for braking 1032, acceleration 1034, cornering 1036 (of which excessively sharp maneuvers may be discerned from gyroscope or accelerometer data, as described with reference to FIG. 7), speeding 1038, phone use while driving 1040, and any other indicia, for example, which may be collected from the systems and sensors described with reference to FIGS. 6 and 7. In addition, in various embodiments, the overall score 1030 may consider the extent to which automated driving features or other operator assistance features are used, as stored in an operator assistance use record 1050. Because such features may reduce the likelihood of an incident, the use of operator assistance features may be considered in evaluating the score of previous trips. The overall score 1030 assigned to the trip 1 record 810 then will be used to determine whether trips or frequent trips along the route are more desirable, preferable or correspond to expanded vehicle capabilities than trips along other routes between the origin and the destination.

Figure 11:
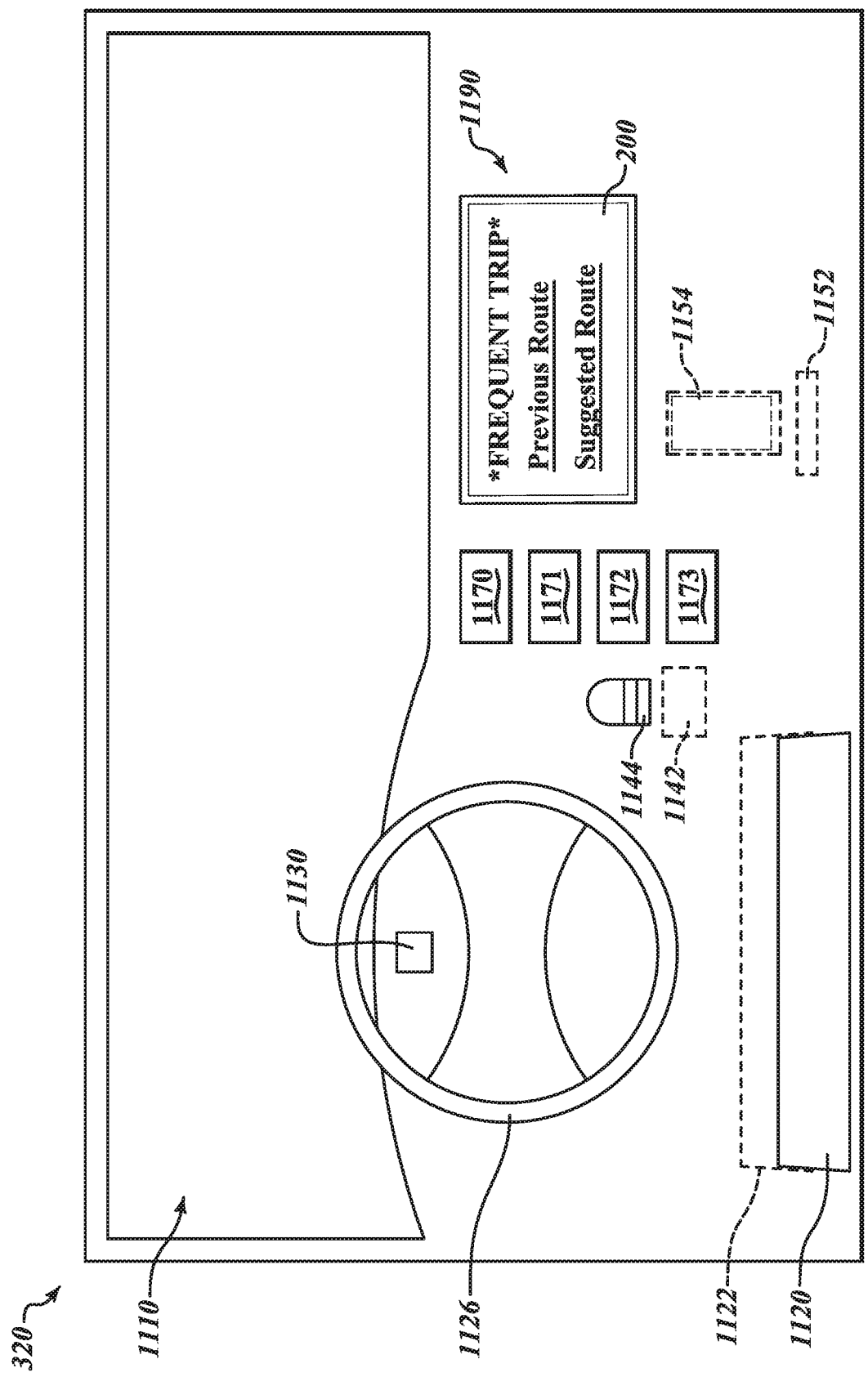
FIG. 11 is a perspective view of a cabin of a vehicle with access to the system of FIG. 3.

Referring to FIG. 11, in various embodiments, a cabin 320 of the vehicle (FIG. 3) includes an operator display and input system 350 (FIG. 3) and a number of devices for identifying the operator and for allowing the operator to choose a route presented by the vehicle data system 380 (FIG. 3) and operation of the operator assist system 360. The cabin 320 familiarly includes a windshield 1110 and an operator's seat 1120, as well as a steering wheel 1126 and other controls, such as the accelerator, brake pedal, and switches to operate the headlights, wipers, etc. (not shown).

To identify the operator, the cabin 320 may include an operator identification system 370 (FIG. 3) that includes some or all of a number of identification devices. A camera or other imaging device 1130 is positioned to image the operator who may be identified using image recognition. The operator also may be identified by the operator adjusting the operator's seat 1120 to an adjusted position 1122 that is favored by a particular operator. The position may be settable by selecting one of a number of memory buttons (not shown) assignable to each of a number of operators. Also, the cabin 320 may include a key fob identifier 1142 that not only recognizes that a key fob 1144 is authorized to operate the vehicle, but to recognize when the key fob 1144 is that assigned to a particular operator. The key fob 1144 may, for example, include an individualized radio frequency identification (RFID) tag and the key fob identifier 1142 may include an RFID reader. Also, the cabin 320 may include a phone connection system 1152 that, in addition to enabling a smartphone 1154 to interact with the vehicle's entertainment system or other systems, identifies whether the smartphone 1154 is associated with a particular operator of the vehicle.

The cabin 320 also includes the display 200 (FIG. 2) that provides information about recommended routes, as previously described. The display 200 may be a touchscreen that enables the operator to choose to navigate to the destination according to the recommended route merely by touching the display 200. In addition, if the recommended route involves automated driving or use of operator assist features, the operator may engage those features by selecting the recommended route by touching the display 200. In some other embodiments, the cabin 320 may include other controls, such as 1170 and 1171 to accept the recommended route, and other controls, such as 1172 and 1173, to engage or disengage automated driving or operator assist features. The controls 1170-1173 may be on a dashboard 1190, on the steering wheel 1126, or on another surface in the cabin 320. It will be appreciated that the controls 1170-1173 may be only a subset of the controls available or needed to engage automated driving or the operator assist features, or some or all of these features may be controllable via the touchscreen display 200. Operator assist features 240, benefits of the recommended route 242, financial benefits of using the recommended route 244, and other information, as described with reference to FIG. 2, also may be presented by the display 200.

Figure 12:
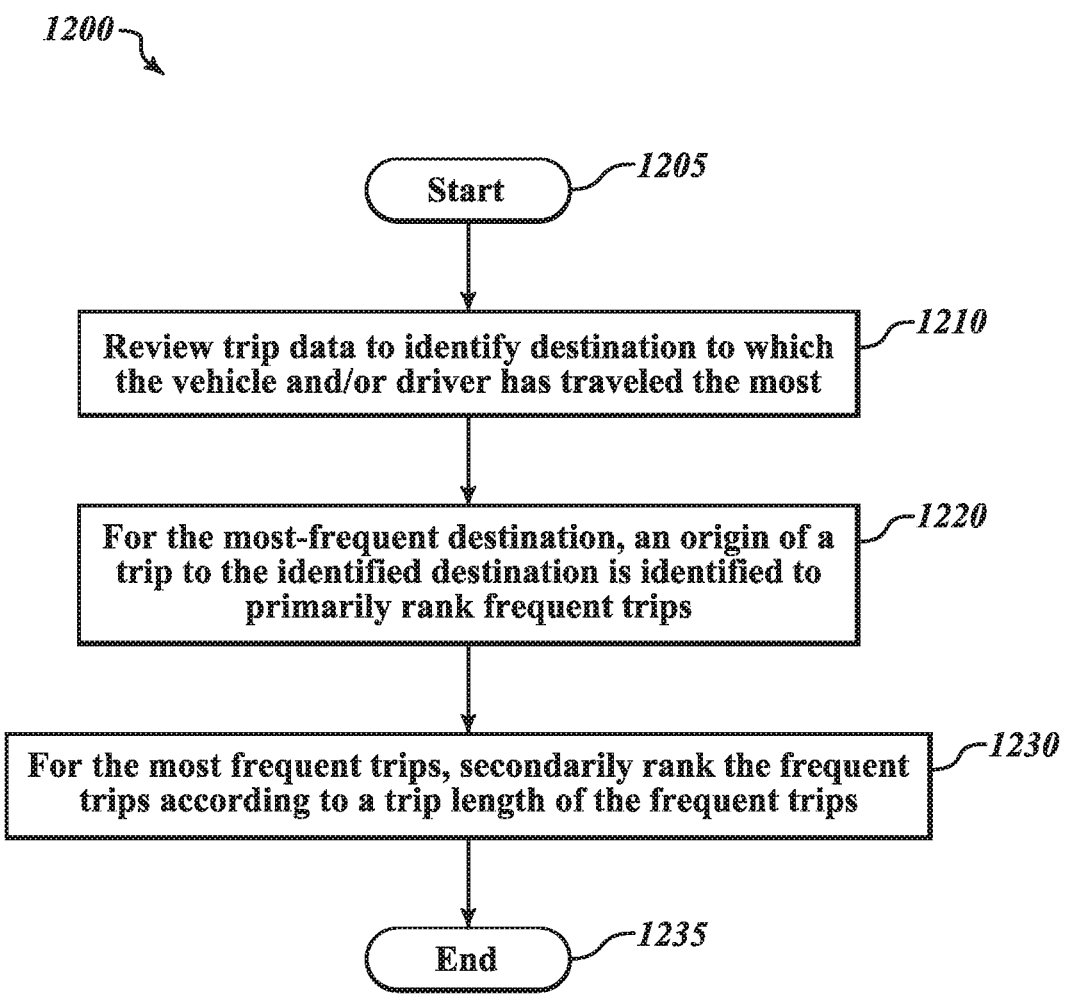
FIG. 12 is a flow chart of an illustrative method of identifying trips taken by a vehicle.

Referring to FIG. 12, in various embodiments an illustrative method 1200 of identifying frequent trips is provided. As previously described, identification of the frequent trips may serve as a basis for recommending alternative routes by analyzing those routes which are most traveled and, thus, may present the most frequent exposure of potential risk of loss. The method 1200 starts at a block 1205. At a block 1210, trip data is reviewed to identify destination to which the vehicle and/or operator has traveled the most. It will be appreciated that frequent trips may present a greatest number of instances for possible loss-related incidents and, thus, it may be desirable to analyze these routes to find alternative routes that present a reduced risk of loss. At a block 1220, for the most-frequent destination, an origin of a trip to the identified destination is identified to primarily rank frequent trips. At a block 1230, the most frequently trips are secondarily ranked according to a trip length of the frequent trips. It will be appreciated that frequent trips of the longest trip length may present a greatest exposure for possible incidents and, thus, the longest trips may be prioritized among the frequent trips for analysis to find alternative routes. Trip length may be determined on a basis of travel distance and/or travel time. The method 1200 ends at a block 1235.

Figure 13:
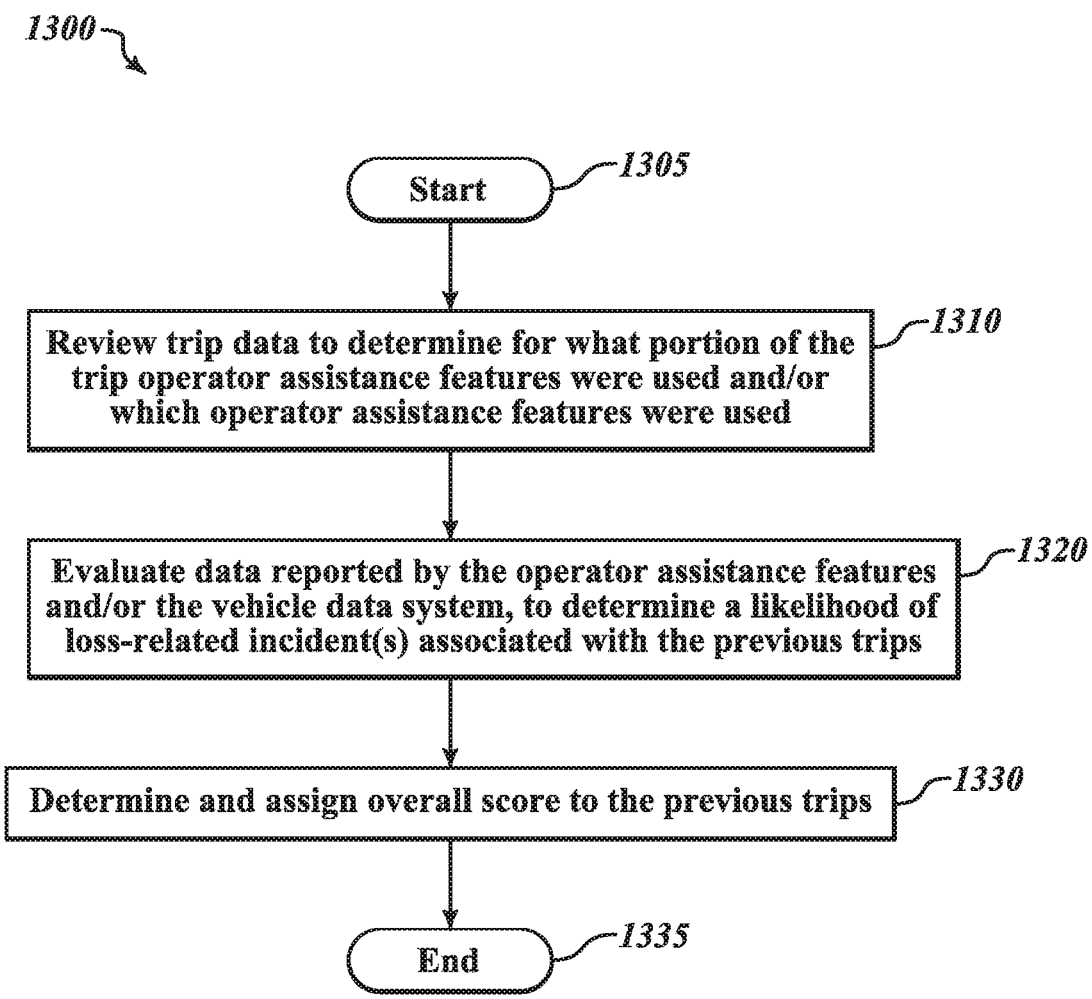
FIG. 13 is a flow chart of an illustrative method of evaluating operator's score for trips taken by the operator.

Referring to FIG. 13, in various embodiments an illustrative method 1300 of evaluating prior trips in the trip data is provided. As previously described, a number of data elements may be presented by the operator assist system 360 and/or vehicle data system 380 (FIG. 2) to determine a likelihood of risk of incident presented by those trips. In a particular embodiment, in addition to evaluating the data elements provided, a degree to which the operator employed operator assist features may be used to evaluate a likelihood of risk associated with the previous trips. The method 1300 starts at a block 1305. At a block 1310, trip data is reviewed to determine for what portion of the trip operator assistance features were used and which operator assistance features were used. The use or lack of use of operator assistance features may be attributable to the route driven. However, the lack of use of operator assistance features may be attributed to operator preferences even when use of the operator assistance features may reduce the likelihood of an incident. At a block 1320, data reported by the operator assistance features and/or the vehicle data system, such as listed in Table (1), are evaluated to determine a likelihood of risk associated with the previous trips. At a block 1330, an overall score is determined and assigned to the previous trips. The overall score, or an average of such scores for a particular route, may be used to provide a basis for comparison for whether a recommended route may present a better alternative and/or to determine potential insurance savings. The method 1300 ends at 1335.

Figure 14:
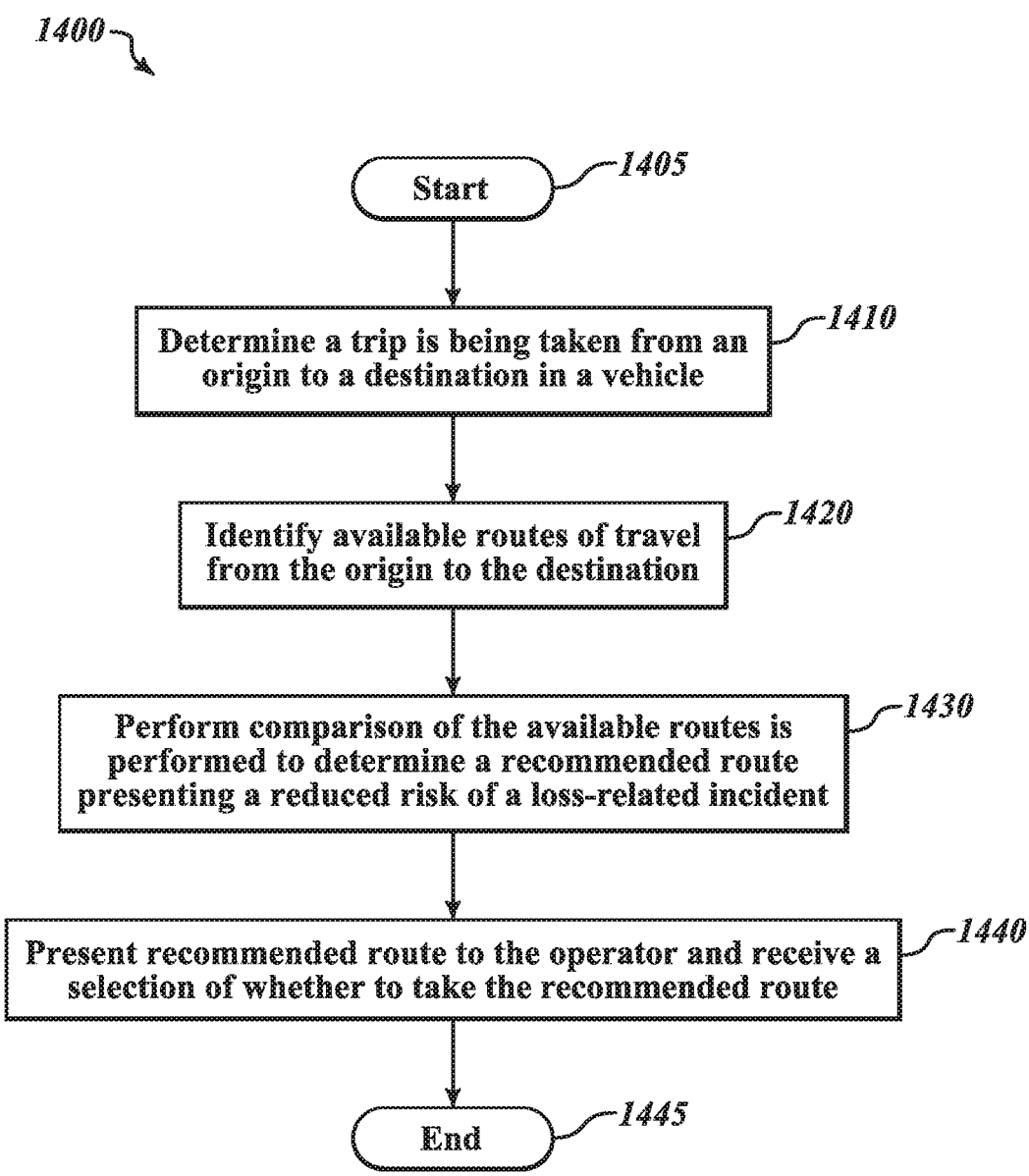
FIG. 14 is a flow chart of an illustrative method of recommending a route.

Referring to FIG. 14, in various embodiments, an illustrative method 1400 is provided for recommending an alternative route. The method 1400 starts at a block 1405. At a block 1410, when a trip is being taken from an origin to a destination in a vehicle is determined, as described with reference to FIGS. 1 and 2. At a block 1420, available routes of travel from the origin to the destination are identified, as previously described with reference to FIG. 4. At a block 1430, a comparison is performed of the available routes to determine a recommended route presenting the lowest likelihood of the vehicle experiencing a collision. At a block 1440, a recommended route is presented to the operator and a selection is received from the operator as to whether to take the recommended route. The method 1400 ends at a block 1445.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A vehicle data system, comprising:
one or more memories storing computer-executable instructions; and
one or more processors coupled to the one or more memories and configured to execute the computer-executable instructions to cause the vehicle data system to:
determine a trip is to be taken from an origin to a destination in a vehicle;
identify available routes of travel for the vehicle from the origin to the destination;
perform a comparison of the available routes to determine a recommended route presenting a reduced likelihood of the vehicle experiencing a loss-related incident based on identifying a recommended route having more availability of one or more driver assistance features along the recommended route than other available routes, wherein the driver assistance features relate to one or more operational or safety features available to the vehicle;
display to an operator of the vehicle a previously-traveled route for a determined trip on a map of a display along with route details for the previously-traveled route;
display to the operator the recommended route on the map of the display with the previously-traveled route along with route details for the recommended route;
display to the operator one or more driver assistance features determined to be more available to the operator of the vehicle along the recommended route than along the previously-traveled route on the display with the recommended route and the previously-traveled route;
display to the operator a financial advantage of implementing the one or more driver assistance features when traveling along the recommended route as compared to traveling the previously-traveled route on the display with the recommended route and the previously-traveled route; and
receive a selection from the operator of the recommended route or the previously-traveled route.

2. The vehicle data system of claim 1, further comprising performing a comparison of the available routes to determine a recommended route presenting a reduced likelihood of the vehicle experiencing a loss-related incident based on the recommended route being relatively less likely to result in a crime involving vehicle theft or vandalism being experienced at any point along the recommended route than the other available routes.

3. The vehicle data system of claim 1, wherein the vehicle data system is further configured to present the recommended route when an anticipated travel time of the recommended route is within a variance of an anticipated travel time of the at least one previously-traveled route.

4. The vehicle data system of claim 3, wherein the vehicle data system is further configured to receive an input from a user specifying a maximum of the variance.

5. The vehicle data system of claim 1, wherein the vehicle data system is further configured, upon determining that the trip is being initiated from the origin to the destination, to determine if the trip is included in a store of frequently-traveled trips in the store of trip data of previous trips taken by least one of the operator and the vehicle.

6. The vehicle data system of claim 1, wherein the vehicle data system is further configured to include in the recommended route a recommended parking location within proximity of the destination wherein the recommended parking location has a reduced likelihood of a parking-related loss-related incident.

7. The vehicle data system of claim 1, wherein the vehicle data system is further configured to perform the comparison of the available routes using historical data chosen from at least one of:
trip data of previous trips taken by one of the operator and the vehicle; and
a database of vehicle incident data in an area encompassing the available routes.

8. The vehicle data system of claim 7, wherein the vehicle data system is further configured to perform the comparison of the trip data of previous trips travelled by one of the operator and the vehicle using sensor data collected from at least one sensor of the vehicle data system including at least one of:
an accelerometer;
a gyroscope;
a following distance sensor;
a tire pressure sensor;

a seatbelt usage sensor;
a phone usage sensor;
a collision sensor;
an airbag deployment sensor; and
a device sensor configured to monitor use of a device chosen from at least one of lights, horn, and wipers.

9. The vehicle data system of claim 7, wherein the vehicle data system is further configured to determine driving habits of the operator stored in the trip data.

10. The vehicle data system of claim 9, wherein the vehicle data system further comprises an operator identifier configured to identify an operator undertaking the trip.

11. The vehicle data system of claim 1, wherein the vehicle data system is further configured to perform the comparison of the available routes under anticipatable travel conditions at a time the anticipatable travel conditions are chosen from conditions including at least one of:
   type of road;
   roadway conditions;
   visibility conditions;
   weather conditions; and
   traffic conditions.

12. The vehicle data system of claim 1, wherein the vehicle data system is further configured to perform the comparison of the available routes using available operator assist capabilities of the vehicle including at least one of:
   automated driving; and
   assisted driving using at least one operator assistance system.

13. The vehicle data system of claim 12, wherein the operator assistance system includes an assistance system chosen from at least one of:
   a forward collision warning system;
   an automatic emergency braking system;
   an adaptive cruise control system;
   a lane departure warning system;
   a lane keeping assist system;
   a blind spot detection system;
   a steering wheel engagement system;
   a traffic sign recognition system;
   a rear cross-traffic alert system;
   a backup warning system;
   an automatic high-beam control system; and
   a manual park assist system.

14. The vehicle data system of claim 11, wherein the vehicle data system is further configured to cause the comparison of the available routes to be performed by a system chosen from:
   the vehicle data system; and
   a remote computing system.

15. The vehicle data system of claim 1, wherein the vehicle data system is further configured to calculate automobile insurance savings attributable to the operator using the recommended route on a regular basis and reporting the automobile insurance savings to the operator.

16. The vehicle data system of claim 1, wherein the vehicle data system is further configured to, in response to receiving the selection from the operator that the operator accepts the recommended route, engage the one or more driver assistance features determined to be more available to the operator of the vehicle along the recommended route than along the previously-traveled route.

17. The vehicle data system of claim 1, wherein the financial advantage comprises vehicle insurance savings that are available if the operator implements the one or more driver assistance features when traveling along the recommended route as compared to traveling the previously-traveled route.

18. The vehicle data system of claim 17, wherein the vehicle data system is further configured to communicate with a vehicle insurance provider to identify the vehicle insurance savings.

19. A vehicle, comprising:
   a cabin configured to receive an operator;
   a drive system configured to accelerate, decelerate, stop, and steer the vehicle;
   an operator control system configured to allow the operator to direct operations of the vehicle;
   an operator assist system configured to perform at least one function chosen from:
      autonomously control the vehicle without assistance of the operator; and
      assist the operator in controlling the vehicle; and
   a vehicle data system including a computing system that is at least one of integrated into operation of the vehicle and a portable computing device aboard the vehicle configured to:
      determine a trip is to be taken from an origin to a destination in the vehicle;
      identify available routes of travel for the vehicle from the origin to the destination;
      perform a comparison of the available routes to determine a recommended route presenting a reduced likelihood of the vehicle experiencing a loss-related incident based on identifying a recommended route having more availability of one or more driver assistance features along the recommended route than other available routes, wherein the driver assistance features relate to one or more operational or safety features available to the vehicle;
      display to an operator of the vehicle a previously-traveled route for a determined trip on a map of a display along with route details for the previously-traveled route;
      display to the operator the recommended route on the map of the display with the previously-traveled route along with route details for the recommended route;
      display to the operator one or more driver assistance features determined to be more available to the operator of the vehicle along the recommended route than along the previously-traveled route on the display with the recommended route and the previously-traveled route; and
      display to the operator a financial advantage of implementing the one or more driver assistance features when traveling along the recommended route as compared to traveling the previously-traveled route on the display with the recommended route and the previously-traveled route.

20. A computer-implemented method, comprising:
   using a vehicle data system configured to monitor travel of a vehicle:
      determining a trip is being taken from an origin to a destination in the vehicle;
      identifying available routes of travel from the origin to the destination;
      performing a comparison of the available routes to determine a recommended route presenting a reduced likelihood of the vehicle experiencing a loss-related incident based on identifying a recommended route having more availability of one or mended route than other available routes, wherein the driver assistance features relate to one or more operational or safety features available to the vehicle;

displaying to an operator of the vehicle a previously-traveled route for a determined trip on a map of a display along with route details for the previously-traveled route;

displaying to the operator the recommended route on the map of the display with the previously-traveled route along with route details for the recommended route;

displaying to the operator one or more driver assistance features determined to be more available to the operator of the vehicle along the recommended route than along the previously-traveled route on the display with the recommended route and the previously-traveled route; and display to the operator a financial advantage of implementing the one or more driver assistance features when traveling along the recommended route as compared to traveling the previously-traveled route on the display with the recommended route and the previously-traveled route.

* * * * *